Figure 1:
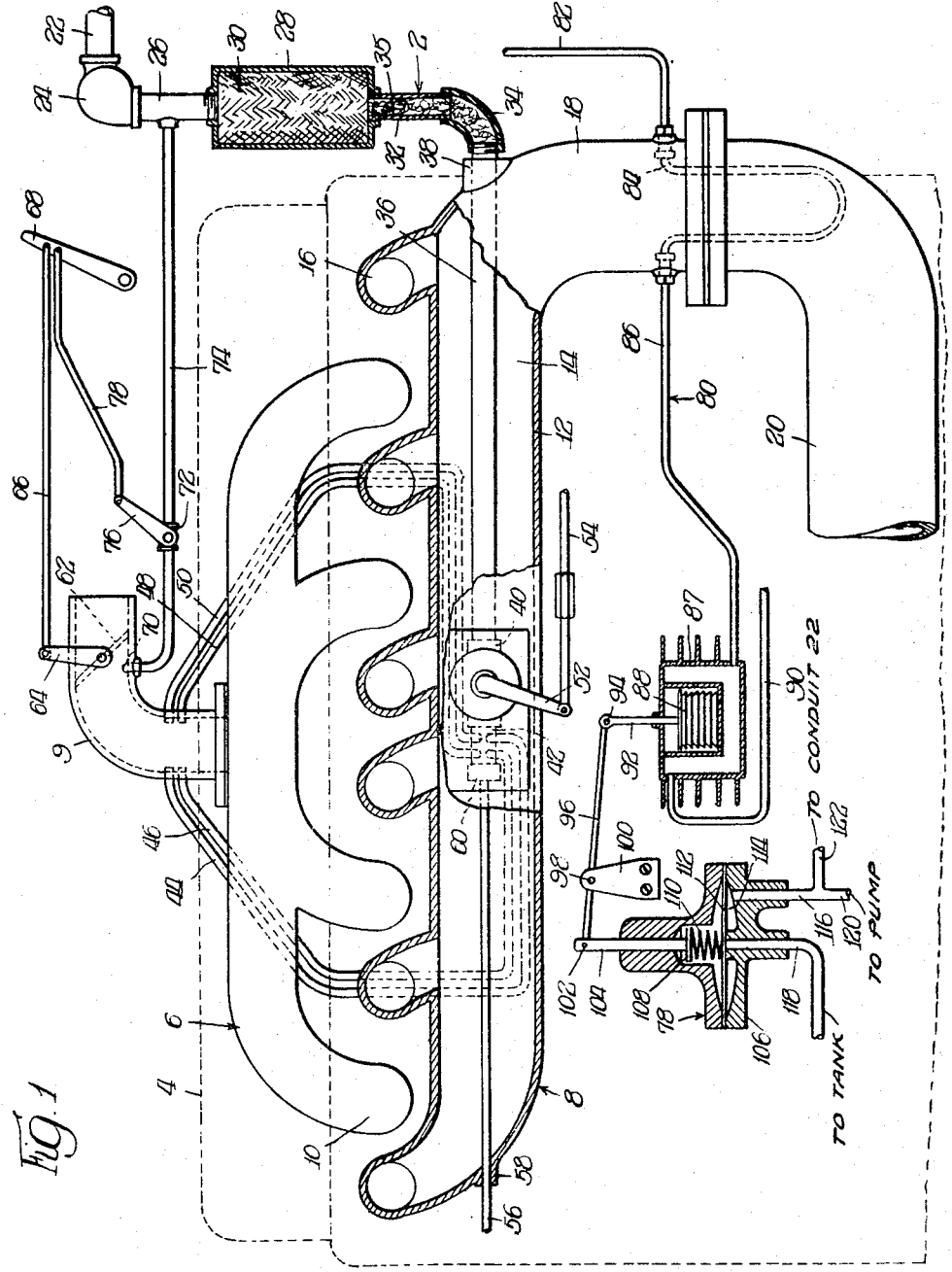

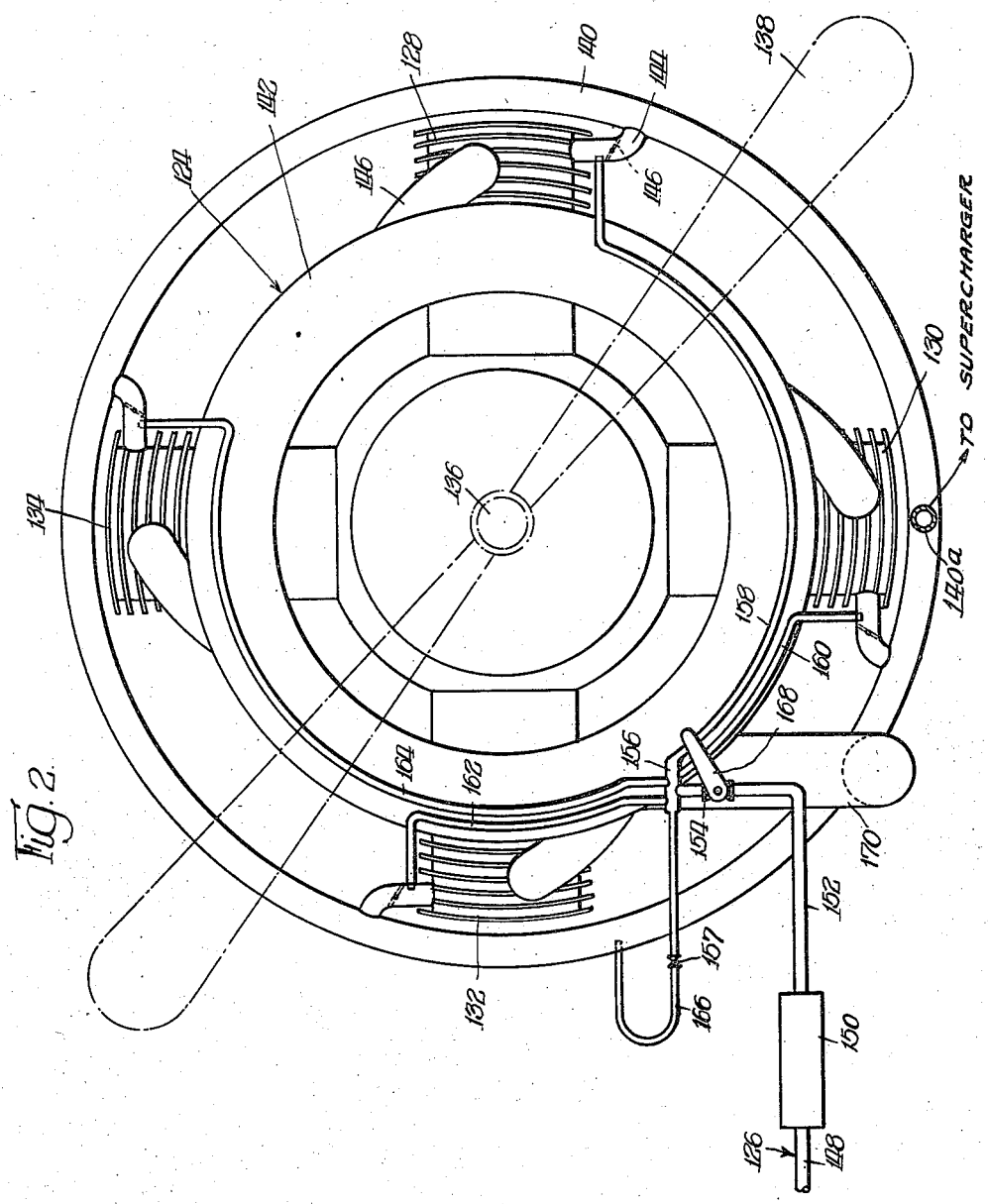

Patented Nov. 4, 1941

2,261,493

UNITED STATES PATENT OFFICE 2,261,493

FUEL FEEDING DEVICE FOR INTERNAL COMBUSTION ENGINES AND THE LIKE

Cecil L. Bowen and John A. Bowen, Pueblo, Colo.

Application August 15, 1938, Serial No. 224,934

18 Claims. (Cl. 123—133)

The present invention relates to internal combustion engines, and more in particular to a novel fuel feeding system therefor.

Among the objects of the present invention is to provide a novel fuel feeding system particularly adapted for internal combustion engines or other fuel consuming devices, wherein fuel is efficiently volatilized and mixed with a combustion supporting medium, such volatilization and mixing being suitably controlled for effective performance of said engine under varying conditions.

The present invention has been developed as a result of careful and considered research on fuel feeding systems of the generator type for internal combustion engines and the like, wherein it was found that there were certain disadvantages in such constructions due to the inability of the systems to control the proper generating or vaporizing of the fuel and the admixing of the combustion supporting medium therewith under all conditions of operation of the said internal combustion engine. The present invention is the result of a concerted effort to eliminate these staring inadequacies and deficiencies in such fuel feeding systems of the type herein disclosed and described, such efforts being directed particularly to suitable structure for controlling the surge previously experienced in the feeding of fuel under the conditions involved in a system of the type herein described. Furthermore, the present invention has solved another serious difficulty hereinbefore experienced, namely, the carbonization of the generator, which carbonization has in the past caused accumulations of carbon in the generator system, thus clogging the distributing system preventing proper feeding of fuel and making such generating and distributing system less receptive to the heat used in generating the fuel. As a third line of pursuit involved in this development work, and of prime importance, is that having to do with the control of the generating of the hydrocarbon fuels and the supply of the same to the internal combustion engine in accordance with all operating conditions.

The principal disadvantages and deficiencies of prior fuel feeding systems for internal combustion engines and the like are set forth above, and the present invention, as clearly indicated, has been directed primarily to eliminating these disadvantages which have, in the past, made such devices impractical and inoperative, although the advantages of such a system have been well known and understood, and there has been a recognition on the part of automotive and aeronautical engineers of the desirability of installing such devices if these disadvantages could be overcome.

It is therefore an object of the present invention to provide a positive force feed fuel supply system for internal combustion engines and the like having improvements incorporated therein which specifically eliminate the disadvantages above enumerated whereby advantage has been taken of the superiority of a fuel generating system, yet wherein suitable means has been provided to insure proper fuel feeding to the internal combustion engine under all conditions of operation.

More particularly, the invention includes as an object the idea of providing a novel force feed fuel supply system for internal combustion engines and the like, wherein float valves and jets have been entirely eliminated, the system operating on the principle of fuel generation with suitable control means therefor, such invention having as one of the desiderata the advantage that the device is particularly adapted for aeronautical internal combustion engines, in which engines in the past float valves and jets have caused considerable difficulty.

Still another object within the purview of the present invention is to provide a novel fuel feeding system for, and a novel method of, feeding fuel to internal combustion engines and the like, wherein the fuel being fed into the intake means for the engine is delivered under pressure at all times and is at a temperature approaching, but never more than, the super-heating temperature of the particular fuel. Such provision is particularly advantageous from the standpoint of efficiency of operation of the device inasmuch as in the past fuel being delivered from generating systems of the type herein disclosed has been superheated to such an extent that the fuel has been burned prior to its discharge into the intake means of the engine, thus decreasing the efficiency of the device.

Still another object of the present invention is to provide a novel positive fuel feeding system wherein certain parts thereof have been so constructed and arranged that the generated fuel being delivered at a plurality of points is equivalently conditioned. That is to say, under certain circumstances it has been found highly desirable to deliver generated fuel at a plurality of points, and for the purpose of securing uniformity of performance of a plurality of cylinders it has been found highly desirable to so construct and proportion certain of the elements of the device that the fuel discharged to each of said plurality of cylinders is conditioned to the same extent and has the same characteristics.

The invention also comprehends the idea of providing a novel force feed fuel delivery system for internal combustion engines and the like operating on the generator principle and being adapted to deliver fuel conditioned to an optimum degree at a point in the intake mechanism for said engine for mixing with a combustion supporting medium, thereby producing a highly combustible fuel mixture which, when consumed, produces a maximum amount of power per unit of fuel. In this regard, it is contemplated that such fuel supply system may be used in an internal combustion engine wherein the intake and exhaust means thereof are independent of one another whereby the intake means is unaffected by heat transfer from the exhaust means, such structure permitting introduction of generated fuel at optimum temperature at a point in the intake means at which a combustion supporting medium can be mixed therewith at substantially atmospheric temperature, it having been found that maximum efficiency can be obtained when the hot expanded hydrocarbon and relatively cold combustion supporting medium are so mixed.

Still again, the present invention contemplates the idea of providing a novel fuel supply system for internal combustion engines or the like, wherein generated gas can be efficiently and effectively delivered to individual intake means for each of the cylinders of said engine, thus securing the advantage of providing for uniform fuel supply to each of said cylinders. More particularly, the invention comprehends such structure wherein the generated fuel is delivered to each of the intake means for the cylinders at a point immediately adjacent the intake valves therefor and at a point in close approximation to the intake for the combustion supporting medium, this arrangement having been found to produce the maximum degree of efficiency obtainable under all operating conditions of said engine.

Still again, another object of the present invention is to provide a novel fuel feeding system for internal combustion engines and the like wherein novel means has been provided to insure uniform discharge of generated fuel to the engine, such means comprising surge control means in the fuel delivery system. More specifically, the fuel supply system includes a filtering device in combination with an expansion chamber, the surge in the system being controlled by suitable means in the filtering device. Thus the filtering device serves in the dual capacity of preventing surge and to preliminarily condition the fed fuel by dispersing the same to a certain degree preparatory to its discharge into further conditioning means in the form of an expansion chamber. In that connection, the invention further contemplates an expansion chamber in heat transfer association with a source of heat so that the fuel supplied thereto from said filtering device is further conditioned by heat treatment into a more finely divided state, which process is quickened and accelerated and more uniformly accomplished by providing a body of heat conducting filamentous material in the expansion chamber and in heat transfer association with the walls thereof whereby heat is more uniformly supplied throughout the entire body of fuel, thus assuring uniform dispersion of the fuel.

Yet another object of the present invention is to provide a novel fuel feeding system operating on the principle of a fuel generator wherein novel means is provided for the intake to the generating means of an oxygen bearing medium such, for example, as air, to prevent carbonization of the generated fuel, it being further contemplated, in order to prevent condensation of generated fuel at the point of such intake, that such oxygen bearing medium, such as air, will be preheated by providing a source of heat in association therewith.

The invention still further contemplates a novel fuel supply system for internal combustion engines and the like provided with fuel conditioning means and having a positive pressure feed wherein means is provided, and operable in accordance with the operation of said fuel conditioning means, for controlling the fuel feeding pressure.

More particularly, the invention contemplates a novel fuel feeding system for internal combustion engines or the like of the generator type, wherein a positive force feed for the fuel is provided, the pressure in the fuel supplying system being controlled by means operable in accordance with the temperature affecting the generator. More particularly, such means includes a control valve for the fuel pressure system, which control valve is operated by means of a thermostat which, in turn, is operated in accordance with the temperature affecting the generating system.

The present invention also comprehends a fuel feeding system of the generating type which is so constructed and arranged that the generator thereof may be disposed in heat transfer association with any part of the engine, although for ease of manufacture and assembly it is preferred in certain types of internal combustion engines that such generator be disposed within the exhaust manifold, thus in heat transfer association with the exhaust gases of said engine.

Still a further object of the present invention is to provide a novel fuel supply system of the generator type for internal combustion engines or the like, wherein force feed is provided for the fuel, the system including delivery of fuel to the generator for operating conditions and to the intake means of the engines for starting purposes, both of said feeds being interconnected and controlled whereby predetermined sequence of operation of the same is effected.

Other objects, features, capabilities and advantages are comprehended by the invention, as will later appear and as are inherently possessed thereby.

Referring to the drawings:

Figure 1 is a diagrammatic sketch of a novel fuel supply system made in accordance with the present invention and showing the same applied to an internal combustion engine, certain parts of the same and engine being shown in cross-section to disclose the construction thereof more in detail; and Figure 2 is a diagrammatic sketch showing an aeroplane type of motor with which is used another embodiment of the novel fuel feeding system made in accordance with the present invention.

Referring now more in detail to the drawings, and particularly the embodiment as shown in Figure 1, the fuel feeding device generally referred to as 2 is shown in association with an internal combustion engine 4 of the automotive type, the same in the present illustration comprising a series of eight cylinders, the intake manifold 6 therefor being disclosed as being independent of the exhaust manifold 8 for a purpose to be referred to hereinafter more in detail. The intake manifold 6, in part, diagrammatically shown as to the position of certain elements in the drawing, has an intake valve and fuel discharge housing 9 communicating with the main part of the intake housing which has branch passageways 10, each of which communicates with two of the cylinders for the engine. The exhaust manifold comprises a main part 12 provided with the elongated chamber or passageway 14 communicating with a series of passageways 16, six being shown, it being understood that two of the same receive exhaust gases from each of two cylinders, thus providing for discharge of exhaust gases from all of the eight cylinders herein provided. The exhaust manifold housing extends downwardly in the conventional manner as at 18 and has the exhaust pipe 20 connected thereto, which exhaust pipe, as usual, may extend toward the rear of the car for discharge of the exhaust products of combustion.

The novel fuel supply system 2 disclosed in this drawing in association with the engine 4, comprises a fuel supply (not shown) which may be located at the rear of the car and which has a discharge to a fuel pump (also not shown), which fuel pump may be conveniently located at or adjacent the motor block 4, the same being of a high pressure positive type directly driven from the motor. It has been found that a pump delivering fuel at the rate of five and one-half gallons per minute and at a pressure of 185 pounds per square inch is ample and sufficient for the fuel supply system herein disclosed. This positive high pressure pump delivers fuel to the fuel supply system through a conduit or pipe 22 which, through the connection 24 and conduit 26, delivers the fuel to a filter 28. In the present illustrative embodiment, such filter or vaporizer 28 takes the form of a chamber in which is disposed a rather compact body of fibrous material 30, such fibrous material as has been found desirable and advantageous being lamp wicking. Connected to the discharge end of the filter 28 is a conduit 32 which, through the fitting 34, is connected to a conduit or pipe 36. The conduit or pipe 36 is disposed in the chamber 14 and is mounted at one end as at 38 in the wall of the manifold housing having a control valve mechanism 40 connected thereto at its other end. Disposed within connections 32 and 34 and expansion pipe 36 is a heat conducting filamentous body of material, one form as used in the present disclosure being bronze wool, which is rather compactly arranged in said elements for a purpose to be hereinafter more fully disclosed. Connected to the control valve 40 located within the chamber 14 of the exhaust manifold is a header 42 to which is connected a plurality of fuel discharge conduits 44, 46, 48 and 50, which fuel conduits are in part disposed within or in association with the exhaust manifold and in part exteriorly thereof and lead to the manifold discharge housing 9, as clearly shown.

The mechanism immediately above described comprises a part of the fuel feeding system of the present invention. The same, as clearly pointed out, includes a positively driven high pressure pump supplying fuel to the system under all operating conditions, first to the filter 28 and thence to the expansion pipe 36 and thence to the header for distribution to the discharge pipes 44, 46, 48 and 50.

Although the filter 28 has been disclosed as including a body of fibrous material 40 for the purpose of initially dispersing the fuel being fed to the system and to initially break the same up into comminuted particles, nevertheless any filtering or vaporizing device may be used in the system which accomplishes this same purpose. This filter in part also serves to prevent surge in the system, thereby assuring a uniform discharge of generated fuel into the cylinder of the internal combustion engine. In the particular illustrative example, it was found desirable to use lamp wicking 30 to accomplish these results, although it is to be understood that other material could be used for the same purpose.

Inasmuch as the present system as disclosed is dependent upon the employment of heat for conditioning the fuel, it was found that, as the next step in the proper volatilization of the fuel, greater efficiency in the device could be secured with a more proper conditioning of the fuel if the expansion chamber and associated parts connected to the filter were filled with a heat conducting filamentous body of material 35, such as steel wool (bronze), whereby the heat from the exhaust gases would be conducted to all portions of the expansion chamber through which the fuel passes, thereby subjecting all of the particles of fuel initially filtered or dispersed by the filter or vaporizer 28 to heat, thus effecting a further subdivision of the fuel particles in their passage through the supply system. In this connection, it is to be understood that the body of material 35 is in heat transfer association with the walls of the expansion tube.

The control valve 40 is of conventional design for controlling the passage of fuel through the system, the same being operated as by means of the lever 52 to which is connected a link 54 connected in a manner to be hereinafter more fully disclosed. The header 42 is in the nature of an extension of the expansion tube 36 and provides a distributing chamber for fuel passing into the discharge pipes 44, 46, 48 and 50. The pipes 44, 46, 48 and 50, as previously referred to in part, are disposed in heat transfer association with the exhaust gases, so that it will be clearly appreciated that the fuel conditioning means or generator as referred to herein comprises the expansion tube 36, header 42 and the valve connection between the two, as well as at least a portion of the discharge tubes 44, 46, 48 and 50. That part of the supply device is in heat transfer association with the exhaust gases from the engine, and it is from such heat of such gases that the fuel is progressively volatilized and the particles thereof progressively comminuted and dispersed to provide for a gas conditioned to such an extent as to produce maximum efficiency of operation in the device. Although in the specific illustration that which has been referred to as the fuel conditioning or generating means has been shown within or in heat transfer association with the exhaust manifold, such fuel conditioning means can be located in any other desired part of the engine in heat transfer association with the heat of combustion of the fuel consumed thereby, or still further, it might be conceivably desirable to provide a separate source of heat for generating said fuel.

The device as shown is constructed and arranged so that the fuel being discharged through discharge pipes 44, 46, 48 and 50 is at a temperature closely approaching, but never more than, the super-heating temperature for the particular fuel passing through the device. In other fuel feeding devices of the generator type, the gas has been heated to super-heating temperatures to produce a dry condition, but it has been found that once the super-heating temperature has been obtained, any further rise in temperature of the gas results in a partial burning of the same, thereby lowering its thermal heat contents and resulting in a lowering of its efficiency as a fuel for the internal combustion engine. In providing for discharge of fuel at the proper temperature as above noted, consideration has been given to the design of the fuel conditioning means and discharge means therefrom, the same being proportioned as to cross-sectional area, thickness of walls and length of the same in heat transfer association with the exhaust gases so that such resulting temperature will be effected, thus leading to increased performance of the engine for a given quantity of fuel generated. More particularly, the length and cross-sectional sides of discharge pipes 44, 46, 48 and 50 have been proportioned in conjunction with the remaining elements of the fuel conditioning means to effect such result.

In previous fuel feeding devices of the generator type, considerable difficulty has been experienced with the carbonization of the fuel conditioning means. As a matter of fact, such carbonization appears to be directly responsible for the lack of commercialization of these devices, and means has been provided in this fuel feeding system to prevent such carbonization, thus rendering this device operative throughout its entire life at the efficiency of a new system. In the illustrative embodiment, an air intake pipe 56 is disclosed as passing through and being mounted in the wall of the exhaust manifold as at 58, the same being connected as at 60 to the header 42. Intake pipe 56 extends beyond the exhaust manifold housing and is provided with a conventional valve (not disclosed) for regulating the amount of air being taken into the system at the header 42. This air intake pipe 56, as shown, is in part disposed within the intake housing and therefore in heat transfer association with the exhaust gases passing therethrough, which construction has been provided to preheat the air being conducted into the header 42 substantially to temperatures of the exhaust gas to prevent condensation of the generated gas at the point of distribution from the header 42. The air serves to maintain a state of oxidation in the header 42 and to prevent reduction of the fuel due to the heat of the exhaust gases which would result, and has resulted in the past, in excessive deposits of carbon in the generator system, thus clogging and blocking the generator, as well as the discharge pipes therefrom, resulting in a lowering of the efficiency of the supply system and preventing the proper discharge of conditioned fuel.

It should also be observed that the intake and exhaust manifold housings are independent of one another, so that the temperature of conditioned fuel in the intake manifold is independent of the heat of the exhaust gases passing through the exhaust manifold. It has been found that maximum efficiency from a given quantity of conditioned fuel can be secured if and when the temperature approaches but does not exceed a super-heating temperature for said fuel, and when fuel in such a condition is mixed with a fuel supporting medium which is at, or substantially at, atmospheric temperatures. This has been provided for in the present device by making the intake and exhaust manifolds independent of one another and providing for mixture of the conditioned gas at the temperature above referred to with the combustion supporting medium at substantially atmospheric temperature. This is accomplished by providing the butterfly valve 62 in the housing 9, which valve is controlled by lever 64 and link 66 connected at one end to lever 64 and at the other end to lever 68, the operation of which will be hereinafter more fully described.

In order to provide for starting of the engine when cold, a starting jet 70 is provided in the manifold housing 9, which jet is connected through the valve 72 and conduit 74 with the positive high pressure pump or the line leading therefrom to the filter 28. Valve 72 is provided with control lever 76 which is connected by means of linkage 78 to lever 68.

The link 54 connected to lever 52 of valve 40 is connected also to lever 68, which lever 68 is in turn connected by any suitable means to a foot or hand control disposed within convenient reach of the operator of the car. Linkage 66, 78 and 54 is so proportioned and adjusted with respect to one another that a proper operation of valve 62 is effected for starting and running conditions of the car whereby proper amounts of a combustion supporting medium are introduced under such operating conditions. Linkage 78 controls lever 76 and is so proportioned and adjusted with respect to valves 62 and 40 that upon operation of lever 68 for starting conditions, such valve 72 is operated to introduce sufficient fuel through jet 70 to start the motor. Furthermore, linkage 54 connected to lever 68 is so proportioned and adjusted that valve 40 is operated under running conditions to control the amount of generated or conditioned fuel passing through the fuel supply system. These linkages are so proportioned that when valve 72 is opened for starting the motor, valve 40 is closed, and when valve 40 is opened for running the motor, valve 72 is closed to prevent passage of fuel through jet 70 into housing 9.

One of the chief difficulties experienced in the past with fuel feeding systems of the generator type has been the inability to control the flow of generated fuel to the cylinder under all operating conditions. For example, when the engine is relatively cold and the generating system is likewise relatively cold at idling speeds, the amount of fuel which is needed to operate the engine is relatively small and the pressure of the system should be correspondingly low so that the engine is not flooded with fuel. On the other hand, as the engine warms up due to operation thereof at speeds above idling speed, or when on the road at traveling speeds, the engine, as well as the exhaust manifold, rises in temperature and causes greater volatilization of the hydrocarbon fuel passing through the supply system. This results in a much leaner mix than needed to operate the engine under such conditions, and accordingly, in order to compensate for this leanness of mix it is necessary to increase the pressure in the system whereby a larger volume of fuel is available for discharge into the manifold.

Still further, it will be clearly appreciated that when the engine is operating at a given speed and suitable pressure has been maintained for said speed, that some means must be provided to lower the pressure when the speed of the engine is lowered to less than that under which the same was operating. In other words, the pressure must be controlled in accordance with the operation of the engine, and particularly in accordance with the operation of the fuel conditioning means.

In the previous devices of the type herein disclosed including the generator, no provision was made for controlling the amount of fuel fed to the engine under varying operating conditions, and accordingly the gas mixture was either too lean or too rich under a variety of motor speeds. To avoid this deficiency and to perfect absolute control over the discharge of gas to the intake manifold, means has been provided in the present device for automatically controlling the pressure in the system in accordance with the operation of the fuel conditioning means. More particularly, the pressure control should be operated in accordance with the generator of the present device, and inasmuch as the operation of the generator is affected by being in heat transfer association with the heat of combustion of fuel consumed by the internal combustion engine, such pressure control means should be operated in accordance with the temperature of such heat of combustion affecting the generation of gas within the generator. More specifically, in the present illustration, inasmuch as the generator is affected by the temperature of the exhaust gases and such temperature is effective in generating the gas, this pressure control means should be operated in accordance with the temperature of said exhaust gases.

Referring to the drawings, such pressure control means is generally referred to as 78 and comprises a fluid circulating system 80 including a conduit 82 connected to the bottom of the water cooling system of the car, said pipe 82 being exposed to atmospheric temperatures and the same being connected to a fitting 84 disposed in the exhaust manifold, the fitting at its other end being connected to a conduit 86 leading to the thermostat 87, the fluid in the circulating system affecting thermally an expansion means 88 and then passing outwardly through a conduit 90 which forms a return below the water pump of the cooling system on the suction side thereof. In effect, this fluid circulating system 80 is a control which operates the expansion means 88 of the thermostat in accordance with changes in temperature of the exhaust gases.

The expansion means 88 of the thermostat is provided with a rod 92 connected as at 94 to a lever 96 fulcrumed as at 98 on the bracket 100, and which lever is connected at its other end as at 102 to the stem 104 of control valve 106. Plunger or stem 104 is in abutting relation by means of shoulder plate 108 with a coil spring 110, which spring is in abutting relation with a flexible diaphragm 112 mounted in the control valve 106. Diaphragm 112 is in a chamber 114 into which leads a conduit 116 and a conduit 118. Conduit 116 has a branch line 120 which is connected to the high pressure pump and a branch line 122 leading to the conduit 22 of the fuel feeding system. Conduit 118 is a return conduit to the fuel tank.

It will therefore be clearly appreciated that the control valve 106, through the diaphragm 112, provides an effective means for regulating the pressure of fuel passing through conduit 122 to conduit 22 and the fuel feeding system. This is accomplished by the diaphragm 112 under the impulse of spring 110 controlled by the thermostat. For example, when the engine is relatively cold, the exhaust gases are also relatively cold, and the expansion means 88 is in a substantially collapsed condition whereby pressure on the spring 110 is relieved, thus permitting diaphragm 112 greater freedom of movement upwardly (as viewed in Figure 1), under pressure of the fuel entering chamber 114. Under such conditions, the gas being pumped from the fuel supply pump to conduit 120 is by-passed through conduit 118 back to the fuel supply tank.

On the other hand, as the motor warms up, the temperature of the exhaust gases increases, which in turn affects fitting 84 and accordingly the thermostat. Under such conditions the thermostatic expansion means 88 expands, raising rod 92 which in turn moves lever 96 about its fulcrum 98 to lower stem 104, thereby compressing the spring 110 to hold the diaphragm 112 in closer approximation to the return conduit 118. When diaphragm 112 is held in said position by spring 110, less fuel is by-passed to the supply tank through return conduit 118 and a greater amount is fed through branch line 122 to the conduit 22, thus supplying a greater amount of fuel to the fuel supply system. This pressure control means operates in the manner described to increase the fuel delivered to the fuel supply system in accordance with the increase in the temperature of the exhaust gases. If at any time the temperature of the motor is decreased due, for example, to a decrease in speed under operating conditions, this in turn causes a decrease in the temperature of the exhaust gases, which in turn affects the thermostat as well as the pressure control valve 106, thus increasing the quantity of fuel being by-passed through pipe or conduit 118 and accordingly lowering the pressure in the system.

Although a fluid thermostatic control has been disclosed in the present embodiment, nevertheless a dry thermostatic control is contemplated, which thermostatic control would be installed to record changes in temperature of the exhaust gases and would be operatively connected to the pressure control valve to regulate the same in accordance with the temperatures of said exhaust gases. Furthermore, any other suitable control for regulating the pressure control valve in accordance with the temperature affecting the fuel conditioning means can be provided and is so contemplated within the scope of the present invention.

In this connection, it should be pointed out that the pressure control should be operable in accordance with the temperatures of the generator. Thus, if the generator system is in heat transfer association with other parts of the motor, or is in heat transfer association with some other source of heat, then the pressure control should be regulated in accordance with the temperature of the generator irrespective of where located. That is to say, should it be found desirable to mount the generator in the head of the motor block, as is well within the purview of this invention, then the pressure control means should be operable in accordance with the temperature affecting the generator in said head.

The present fuel supply system has been used for operating an internal combustion engine, and it has been found that by proper regulation of the various elements, smooth performance can be effected with a low consumption of gas. Under actual operating conditions, the pressures of the fuel system were as follows:

Cranking speed—3 to 6 pounds;
Idling on cold motor—approximately 6 pounds;
Idling on hot motor—10 pounds; and
Running speeds—up to 100 pounds.

All of the above is quoted in terms of pounds per square inch.

As a further advantage of the present device, it has been found that low test, relatively inexpensive hydrocarbon fuel can be used with an increase of miles per gallon far in excess of the mileage which could be secured from far more expensive fuel operating under similar conditions. Tests have been run wherein substantially a forty percent increase in mileage has been obtained at fifty miles per hour and with a modern automobile, and where the device has properly designed and adjusted parts for the fuel supply system, it has been estimated that at speeds of from fifty to seventy miles per hour, the increased mileage per unit of fuel will range between sixty and one hundred percent. These are all factors which make the device particularly applicable to automotive internal combustion engines.

As hereinbefore indicated, the present invention comprehends a fuel feeding system particularly adapted for aeronautical internal combustion engines wherein floats and jets of the ordinary carburizing devices have in the past led to serious difficulties. In this connection, the present fuel supply device is free from such elements and is effectively operable irrespective of the position of the aeroplane.

In the illustrative embodiment of Figure 2 is diagrammatically shown an aeroplane motor, generally referred to as 124, in association with which is a fuel feeding system, generally referred to as 126, made in accordance with the present invention. The aeroplane motor 124 is, in certain respects, of conventional radial type comprising cylinders 128, 130, 132 and 134 disposed at ninety degrees to one another and operating, through shaft 136, the propeller blade 138. In this motor, an annular intake manifold 140 is provided which may, by way of a conduit 140a, be connected to a supercharger (not disclosed), and radially spaced and concentric therewith is the exhaust manifold 142. Extending from the intake manifold 140 and for each of the cylinders is an intake housing 144 providing a separate intake chamber for each of the cylinders. Similarly, each of the cylinders is provided with an exhaust conduit 147 leading into the exhaust manifold 142.

In this embodiment the fuel feeding system comprises a conduit 148 leading to a high pressure fuel pump (not disclosed) in the same manner as conduit 22. This conduit 148 leads into the filter 150 which, through conduit 152 and control valve 154, leads into the header 156 corresponding to header 42 of the first described embodiment, and forming in part the fuel conditioning means for the present fuel feeding system. Leading from the header 156 are conduits 158, 160, 162 and 164 which communicate with the individual intake manifold chambers 144 of cylinders 128, 130, 132 and 134, respectively. These conduits 158, 160, 162 and 164 form in part the fuel conditioning means, and the same, together with the header 156, are disposed within the exhaust manifold 142 whereby, through heat transfer from the exhaust gases, the fuel passing through the system is conditioned.

In order to prevent carbonization of the fuel generating means, an air intake 166 is provided which leads from the intake manifold 140 to the generator 156 and is of smaller cross-sectional area than the generator tubes 158, 160, 162 and 164, the air passing therethrough being controlled by a valve 157. This construction is provided inasmuch as aeroplane motors are in a good many cases provided with a supercharger to force air into the intake manifold, and accordingly to balance the fuel mixture to the individual cylinders the fuel from generator tubes 158, 160, 162 and 164 should be delivered to said cylinders in accordance with the operation of said supercharger. Therefore, in order to prevent decarbonization of the fuel in the fuel delivery system under all conditions of operation of the supercharger delivering a combustion supporting medium via the intake manifold, it is proposed that the valve 157 be in the nature of a metering jet operable in accordance with the supercharger, thus delivering air to the fuel feeding system in proper amounts to effect this decarbonization.

It is of course understood that if no supercharger is used, the air intake duct 166 may terminate exteriorly of intake manifold 140 and be controlled by any suitable valve, as in the illustration of Figure 1.

Inasmuch as each of the cylinders is of similar construction and arranged in respect to the intake and exhaust manifolds, as well as the fuel supply system, in the same manner, reference will be made to cylinder 128 in a further description of the fuel feeding system. Disposed within the individual intake manifold chamber 144 is a valve 146 for controlling the amount of combustion supporting medium entering into the fuel mixing chamber. The conduit 158 extends to and enters the intake manifold chamber 144 beyond valve 146 and between the same and the intake valve for the cylinder which, although not shown on the drawings, is beyond conduit 158 and within the cylinder block itself. Each of the remaining conduits enters its respective intake manifold chamber in the same manner, and said valves 146 of the cylinders are controlled by suitable linkage (not disclosed), which linkage, in turn, is operatively connected to lever 168 controlling valve 154. This linkage is adjusted in the same manner as linkages 54 and 66 of the previously described embodiment, whereby a suitable fuel mix is provided for the cylinders under all conditions of operation.

It is the desire in this particular embodiment to incorporate the features of construction shown in Figure 1 of the drawings. That is to say, the apparatus is so constructed and arranged that the fuel delivered to the individual intake manifold chambers 144 is at a temperature approaching, but never greater than the super-heating temperature for the fuel, and said apparatus is also so designed that the fuel delivered at the four points designated is equivalently conditioned so as to have uniform performance of the cylinders. Furthermore, by introducing the conditioned fuel immediately adjacent the intake valve for the cylinders and mixing the same with air at substantially atmospheric temperature at that point, maximum efficiency is secured.

Still again, in the illustrative embodiment of Figure 2, it is contemplated that the pressure within the fuel supply system will be regulated by suitable pressure control means, corresponding to those hereinbefore described in connection with the device of Figure 1, and operable in accordance with the temperature of the exhaust gases in the exhaust manifold, it being understood, of course, that this is the temperature affecting the generation of fuel for this device. Under certain circumstances it may be desirable to cover the individual conduits 158, 160, 162 and 164 with asbestos, or other similar material, to prevent raising the temperature of the conditioned gas beyond the point designated, which construction can be incorporated, if found desirable.

It is understood that the filter 150 may be of the construction as shown in Figure 1, or otherwise, and, as will be noted, conduit 152 extends inwardly and into exhaust pipe 170 from the exhaust manifold, and therefore said conduit serves as an expansion chamber corresponding to expansion tube 136. This tube also may incorporate a packing of steel wool (bronze) for the purpose of dispersing and effecting volatilization of the fuel, all as hereinbefore described.

The embodiment shown in Figure 2 is illustrative of the adaptability of the present fuel feeding device in that the same very conveniently lends itself to individual distribution of conditioned fuel to each individual cylinder. This is a distinct advantage in any type of internal combustion engine, and particularly an aeroplane motor. Furthermore, the device has no float valves or jets to become inoperative, and accordingly the present fuel feeding system lends itself admirably to the construction of suitable aeroplane motors wherein the safety factor has been increased tremendously from the standpoint of proper operation of the motor at all times and under all conditions. Inasmuch as applicants' invention embraces within its scope various arrangements in internal combustion engines whereby the generator is in heat transfer association with a source of heat such as produced by said engines during operation, it is to be understood that the term "in heat transfer association with said engine," or the like, used in the specification and claims is to be interpreted to embrace assemblies wherein the said generator is in heat transfer relation with the heat of combustion of the fuel or the exhaust gases.

While we have herein described and upon the drawings shown illustrative embodiments of the invention, it is to be understood that the invention is not limited thereto but may comprehend other constructions, arrangements of parts, details, features and method steps without departing from the spirit of the invention.

We claim:

1. In an internal combustion engine, the combination of intake means for each of the cylinders thereof, a fuel supply, means for delivering fuel from said supply to each of said intake means, said fuel delivery means including fuel generating means in heat transfer association with the heat of said engine, and means operable in accordance with change in temperature of the heat of said engine for regulating the pressure of said fuel delivering means for varying the quantity of fuel supplied to said engine in accordance with demand, said generating means including discharge means communicating with each of said intake means.

2. In an internal combustion engine, the combination of intake manifold means having a separate manifold chamber for each of the cylinders thereof, a fuel supply, means for delivering fuel from said supply to each of said manifold chambers, said fuel delivery means including fuel generating means in heat transfer association with the heat of said engine having discharge means into each of said manifold chambers, means for introducing a combustion supporting medium into each of said manifold chambers to mix with said generated fuel for said cylinders, and means operable in accordance with change in temperature of the heat of said engine for regulating the pressure of said fuel delivering means for varying the quantity of fuel supplied to said engine in accordance with demand.

3. In an internal combustion engine, the combination of intake manifold means having a separate manifold chamber for each of the cylinders thereof, a fuel supply, each of said cylinders having an intake valve in communication with one of said chambers, means for delivering fuel from said supply to each of said manifold chambers, said fuel delivery means including fuel generating means in heat transfer association with the heat of said engine having discharge means into each of said manifold chambers, means for introducing a combustion supporting medium into each of said manifold chambers to mix with said generated fuel for said cylinders, and means operable in accordance with change in temperature of the heat of said engine for regulating the pressure of said fuel delivering means for varying the quantity of fuel supplied to said engine in accordance with demand, said discharge means communicating with each of said chambers between said intake valve and said last-named means.

4. In an internal combustion engine, the combination of spaced intake and exhaust manifolds, said intake manifold having a separate manifold chamber for each of the cylinders of said engine, a fuel supply, means for delivering fuel from said supply to each of said manifold chambers, said fuel delivery means including fuel generating means in heat transfer association with said exhaust manifold having discharge means into each of said manifold chambers, means for introducing a combustion supporting medium into each of said manifold chambers to mix with said generated fuel for said cylinders, and means operable in accordance with change in temperature of the heat of said engine for regulating the pressure of said fuel delivering means for varying the quantity of fuel supplied to said engine in accordance with demand.

5. In an internal combustion engine, the combination of radially spaced intake and exhaust manifolds, said intake manifold having a separate manifold chamber for each of the cylinders of said engine, a fuel supply, means for delivering fuel from said supply to each of said manifold chambers, said fuel delivery means including fuel generating means in heat transfer association with said exhaust manifold having discharge means into each of said manifold chambers, means for introducing a combustion supporting medium into each of said manifold chambers to mix with said generated fuel for said cylinders, and means operable in accordance with change in temperature of the heat of said engine for regulating the pressure of said fuel delivering means for varying the quantity of fuel supplied to said engine in accordance with demand.

6. In an internal combustion engine, the combination of intake means for said engine, a fuel generating means formed in part by a generator member having a header and in part by a plurality of conduits extending from said header to said intake means, and means for introducing an oxygen bearing medium into said header to prevent carbonization of said fuel.

7. In an internal combustion engine, the combination of intake means for said engine, a fuel generating means in heat transfer association with the heat of said engine formed in part by a generator member having a header and in part by a plurality of conduits extending from said header to said intake means, means for introducing an oxygen bearing medium into said header to prevent carbonization of said fuel, and means for pre-heating said medium prior to its introduction into said header.

8. A fuel distributing system for an internal combustion engine, comprising a fuel supply, means for delivering fuel under pressure from said supply to said engine including fuel generating means in heat transfer association with the heat of said engine, and means operable in accordance with change in temperature of the heat of said engine for regulating the pressure of said fuel delivering means for varying the quantity of fuel supplied to said engine in accordance with demand.

9. A fuel distributing system for an internal combustion engine, comprising a fuel supply, means for delivering fuel under pressure from said supply to said engine including fuel generating means, and means operable in accordance with the operation of said fuel generating means for regulating the pressure of said fuel delivering means for varying the quantity of fuel supplied to said engine in accordance with demand.

10. A fuel distributing system for an internal combustion engine, comprising a fuel supply, means for delivering fuel under pressure from said supply to said engine including a fuel generating means in heat transfer association with the exhaust gases of said engine, and means operable in accordance with the temperature of said exhaust gases for regulating the pressure of said fuel delivering means for varying the quantity of fuel supplied to said engine in accordance with demand.

11. A fuel distributing system for an internal combustion engine, comprising a fuel supply, means for delivering fuel under pressure from said supply to said engine including a fuel generating means in heat transfer association with the exhaust gases of said engine, a thermostat operable in accordance with the temperature of said exhaust gases, and means operated by said thermostat for regulating the pressure of said fuel delivering means for varying the quantity of fuel supplied to said engine in accordance with demand.

12. A fuel distributing system for an internal combustion engine, comprising a fuel supply, means for delivering fuel from said supply to said engine including a high pressure pump driven by said engine, said means having a control valve and by-pass, said means further including a fuel generating means in heat transfer association with the exhaust gases of said engine, and means operable in accordance with the temperature of said exhaust gases for regulating said valve and by-pass to control the pressure of said fuel delivering means for varying the quantity of fuel supplied to said engine in accordance with demand.

13. A fuel distributing system for an internal combustion engine, comprising a fuel supply, means for delivering fuel from said supply to said engine including a high pressure pump driven by said engine, said means having a control valve and by-pass, said means further including a fuel generating means, and means operable in accordance with the operation of said fuel generating means for regulating said valve and by-pass to control the pressure of said fuel delivering means for varying the quantity of fuel supplied to said engine in accordance with demand.

14. A fuel distributing system for an internal combustion engine, comprising a fuel supply, means for delivering fuel from said supply to said engine including a high pressure pump driven by said engine, said means having a control valve and by-pass, said means further including a fuel generating means in heat transfer association with the exhaust gases of said engine, a thermostat operable in accordance with the temperature of said exhaust gases, and means operated by said thermostat for regulating the pressure of said fuel delivering means for varying the quantity of fuel supplied to said engine in accordance with demand.

15. A fuel distributing system for an internal combustion engine, comprising a fuel supply, means for delivering fuel under pressure from said supply to said engine, said means including fuel generating means, means for preventing surge of fuel in said fuel delivering means, and means operable in accordance with the operation of said fuel generating means for regulating the pressure of said fuel delivering means for varying the quantity of fuel supplied to said engine in accordance with demand.

16. A fuel distributing system for an internal combustion engine, comprising a fuel supply, means for delivering fuel under pressure from said supply to said engine, said means including fuel generating means in heat transfer association with the heat of said engine, fuel dispersing and surge control means in said delivering means, means for preventing carbonization of fuel in said fuel generating means, and means operable in accordance with the temperature of the heat of said engine for regulating the pressure of said fuel delivering means for varying the quantity of fuel supplied to said engine in accordance with demand.

17. In an internal combustion engine, the combination of an air intake means and an exhaust means therefor, a fuel supply, means for delivering fuel from said supply to said air intake means, said fuel delivering means including a generator in heat transfer association with the heat of said engine, a supercharger for said air intake means, an air intake from said air intake means to said generator to prevent carbonization of fuel in said fuel delivering means, and means in said air intake operable in accordance with the pressure of said supercharger to vary the amount of air passing through said air intake.

18. In a fuel distributing system, the combination of a fuel supply, a source of heat, a fuel generating means in heat transfer association with said source of heat and connected to said supply, means for delivering fuel from said supply to said fuel generating means under pressure, and means operable in accordance with changes in temperature of said source of heat for regulating the pressure of said fuel delivering means to vary the quantity of fuel supplied by said fuel generating means in accordance with demand.

CECIL L. BOWEN.
JOHN A. BOWEN.